United States Patent [19]

Hornacek

[11] Patent Number: 4,674,948

[45] Date of Patent: Jun. 23, 1987

[54] HIGH WEIGHT CAPACITY ROBOT TO PICK AND PLACE PALLETED MATERIALS IN A CONFINED SPACE WITH SPECIFIC ROTATIONAL CONTROL

[75] Inventor: Kenneth J. Hornacek, Pontiac, Mich.

[73] Assignee: Industrial Technology Institute, Ann Arbor, Mich.

[21] Appl. No.: 756,006

[22] Filed: Jul. 17, 1985

[51] Int. Cl.$^4$ .................... B65G 47/34; B65G 29/00
[52] U.S. Cl. .......................... 414/744 A; 414/269; 901/11; 901/17; 901/21
[58] Field of Search ............... 414/744 A, 744 R, 269; 901/11, 17, 21

[56] References Cited

U.S. PATENT DOCUMENTS

| | | | |
|---|---|---|---|
| 1,851,262 | 3/1932 | Riblett | 414/241 |
| 2,770,141 | 11/1956 | Dinsmore | 414/744 X |
| 3,522,838 | 8/1970 | Ott | 414/744 A X |
| 3,575,301 | 4/1971 | Panissidi | 414/744 X |
| 3,834,555 | 9/1974 | Bennington et al. | 901/17 X |
| 3,870,164 | 3/1975 | Haase | 901/17 X |
| 3,885,678 | 5/1975 | Borg et al. | 901/17 X |
| 4,273,504 | 6/1981 | Shimatake et al. | 901/21 X |
| 4,514,136 | 4/1985 | Abe | 414/744 A |

FOREIGN PATENT DOCUMENTS

| | | | |
|---|---|---|---|
| 555006 | 5/1977 | U.S.S.R. | 901/11 |
| 707792 | 1/1980 | U.S.S.R. | 901/11 |
| 841960 | 6/1981 | U.S.S.R. | 901/11 |

Primary Examiner—L. J. Paperner
Assistant Examiner—Stuart J. Millman

Attorney, Agent, or Firm—Harness, Dickey & Pierce

[57] ABSTRACT

A four-axis robot has three independent linear motions and one rotational component. The robot is disposed between a pair of confronting storage units and is operable to store and retrieve articles in and from them. The robot comprises a carrier disposed half-way between the two storage units for travel parallel to the units. A head is supported from the carriage and in turn supports an arm for horizontal extension and retraction. The head can be both elevated and lowered along, as well as rotated about, a vertical axis. The head and arm are capable of 180° rotary motion about the vertical axis to access the two storage units. Specific rotational control of the head is provided by a unique actuating mechanism with associated adjustable stops. The mechanism includes a linearly movable gear rack operated by a power cylinder and meshing with a pinion concentric with the vertical axis. The pinion is mounted on the bearing portions of a ball spline shaft and bearing coupling. The head is affixed to the shaft portion of the coupling so that it can be vertically positioned independently of rotary motion imparted to the coupling, yet with rotary motion imparted to the coupling being effective to rotate the head. A second pinion affixed to the coupling concentric with the first pinion operates a driven gear rack and the adjustable stops are selectively cooperatively associated with the driven gear rack to control the rotary positioning of the coupling and twice of the head and arm. The stops are selectively operated along linear paths of travel by respective actuators and toggle mechanisms.

37 Claims, 16 Drawing Figures

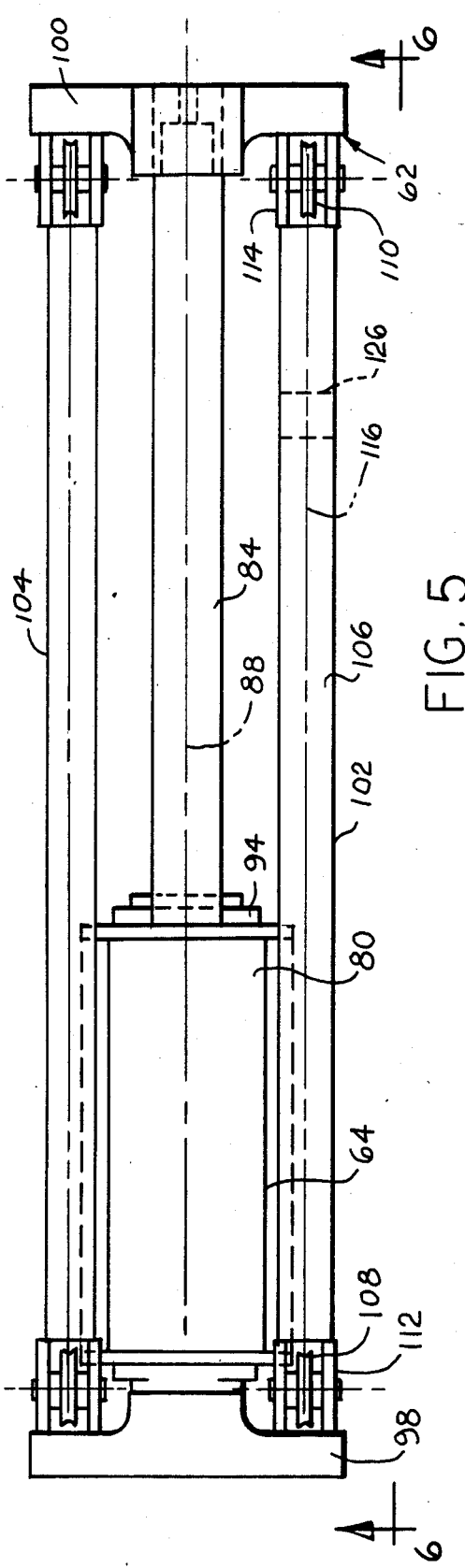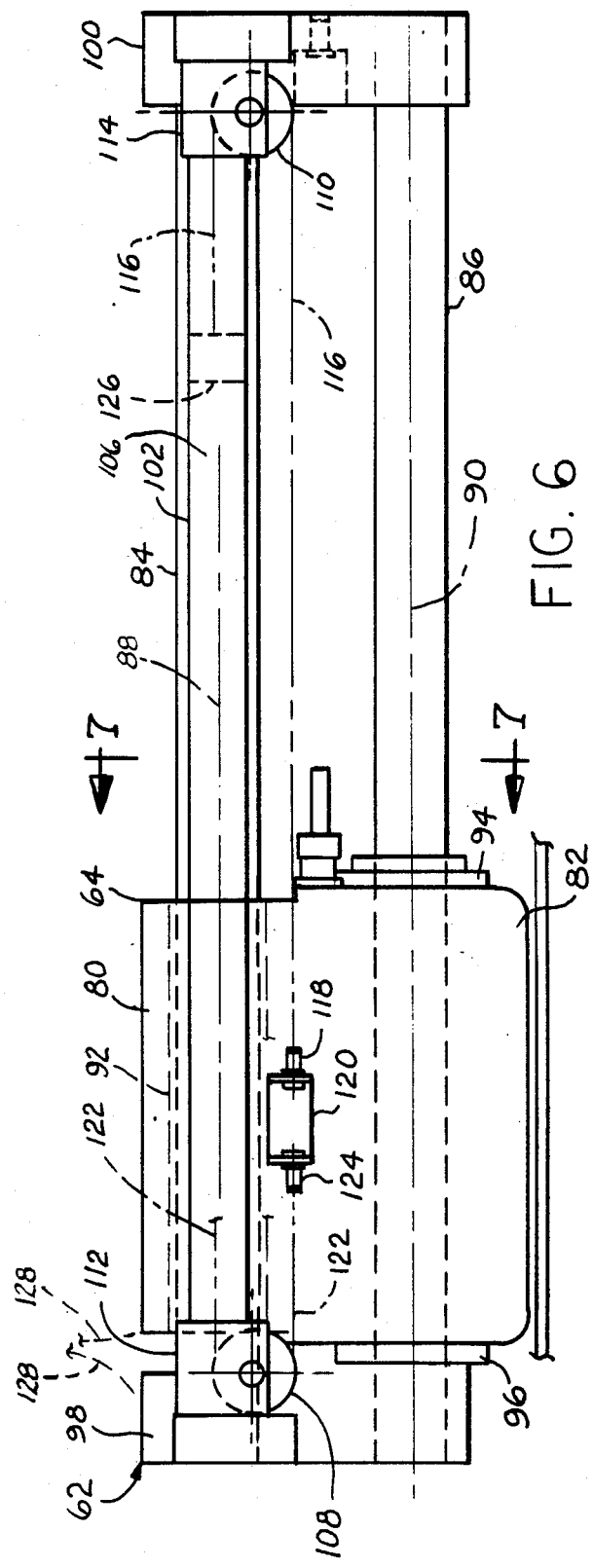

HIGH WEIGHT CAPACITY ROBOT TO PICK AND PLACE PALLETED MATERIALS IN A CONFINED SPACE WITH SPECIFIC ROTATIONAL CONTROL

BACKGROUND AND SUMMARY OF THE INVENTION

This invention relates generally to robots. More specifically, it relates to robots of the type which are commonly referred to as pick and place robots.

Pick and place robots are used in material handling applications where it is desired to move an object from one place to another by grasping the object, moving the object, and then releasing the object.

There are many known types of pick and place robots. Some are relatively simple devices, others are more sophisticated.

The robot of the present invention is particularly, although not exclusively, adapted for moving objects in a confined space with specific rotational control.

In the disclosed application of the present invention in a storage/retrieval system, the robot is disposed in a confined space between a pair of confronting storage units which have a number of unique storage locations for palleted articles. The robot is operable to store a palleted article by grasping it at a point of ingress to the system, moving the article to a desired storage location in one of the storage units, and then releasing it at that location. When an article is to be retrieved from storage, the robot picks it up at its storage location, moves it to a point of egress from the system, and then releases it. The disclosed system has a common ingress/egress point. It is also possible for the robot to rearrange the stored articles within the storage units.

Each of the storage units comprises a series of horizontal storage shelves which are disposed at intervals along the length of an endless vertical track. The storage shelves are coupled for travel in unison along the track while at all times remaining horizontal to support any articles which have been placed upon them. The endless vertical track consists of two vertical segments joined at respective ends by semi-circular segments. One of the two vertical segments of each storage unit's track is toward the front of the unit, and the two units are arranged so that their fronts face each other across the confined space where the robot is located. Articles are stored and retrieved via openings in the fronts of the storage units. Each storage shelf is compartmentalized into a number of individual storage compartments so that each compartment can store one pallet. Greater detail of these particular storage units will be presented later on in the description.

The robot is arranged for horizontal longitudinal travel parallel to the lengths of the shelves, and for this purpose comprises parallel guides which extend in that direction and a carrier which travels on the guides. The two storage units are equidistant from the path of carrier travel.

An arm which has a gripper mechanism at its distal end is supported on the carrier. The particular form of gripper mechanism will depend upon the nature of the particular articles which are to be handled. In the illustrated embodiment, it comprises a pair of spaced apart tines which are operable for engagement with generally rectangular shaped pallets.

The arm is supported on the carrier by a mechanism which enables the arm to be: (1) vertically raised and lowered relative to the carrier; (2) to be rotated about a vertical axis; and (3) to be displaced horizontally along a radial relative to the vertical axis of rotation.

Accordingly, the combined carrier and arm motions constitute the robot a four-axis mechanism capable of three linear motions and one rotational component, all independent. Certain principles of the invention however may be adapted to other than four-axis designs.

One of the outstanding attributes of the invention is that it can fit and operate within the laterally confined space between the two confronting storage units of the type described, while simultaneously being able to accurately position the gripper mechanism, particularly with reference to rotational positioning about the vertical axis, and with the ability to handle relatively heavy loads.

In the illustrated embodiment of the invention, the point of ingress and egress of a palleted article to and from the storage system lies adjacent one end of the horizontal longitudinal travel of the carrier, just beyond the storage units. When the robot is to store an article, it extends its arm to grasp the article at the point of ingress and egress. It then moves the article horizontally in the longitudinal direction so as to bring the article between the two storage units, and it also rotates the arm, either clockwise or counterclockwise depending upon which storage unit is to receive the article, so as to position the grasped article in front of a particular storage location. The arm then extends to place the article at the desired storage location and to release it.

Because a gripped article is disposed at an extended radial distance from the vertical axis of rotation, small angular errors in rotational positioning can be amplified into significant errors in longitudinally locating the article in relation to the desired storage location, even with extreme accuracy in positioning of the carrier. The problem is compounded when relatively heavy articles are being handled.

One of the important features of the present invention is that the robot mechanism is capable of reducing such rotational positioning errors essentially to zero. In the disclosed embodiment this is accomplished by a unique mechanism which includes adjustable stops cooperatively associated with a rack and pinion mechanism operated by a cable cylinder to define precise stopping locations correlated with precise positioning of the articles, yet which allows the robot to serve the two confronting storage units within the laterally confined space between them, and to access the point of ingress and egress.

Moreover, the robot comprises a construction and arrangement which maintains vertical accuracy, despite the imposition of substantial loads acting at an appreciable distance from the axis of rotation. In other words, the torque which is imposed on the vertical axis due to the support of a heavy load at an extended distance is well-accomodated and does not impair the accuracy of the positioning while the robot's arm moves the heavy load.

The arrangement of operators for imparting the various motions to the robot is also advantageous, contributing to the robot's compactness, yet endowing it with the ability to move relatively heavy loads with accuracy and speed.

The robot and storage/retrieval system is adaptable to a computer-based control where identities of articles and their storage locations are electronically recorded, and articles are stored, retrieved, or re-arranged within storage under computer control.

The foregoing features, advantages, and benefits of the invention, along with additional ones, will be seen in the ensuing description and claims which should be considered in conjunction with the accompanying drawings. The drawings disclosed a preferred embodiment of the invention according to the best mode contemplated at the present time in carrying out the invention.

BRIEF DESCRIPTION OF THE DRAWINGS

FIG. 5 is a top plan view of the robot arm illustrating details.

FIG. 6 is an elevational view of FIG. 5 taken in the direction of arrows 6—6 in FIG. 5.

FIGS. 11A, 11B and 11C are schematic diagrams useful in explaining certain aspects of the robot's operation, particularly for rotational positional control.

DESCRIPTION OF THE PREFERRED EMBODIMENT

Figure 1:
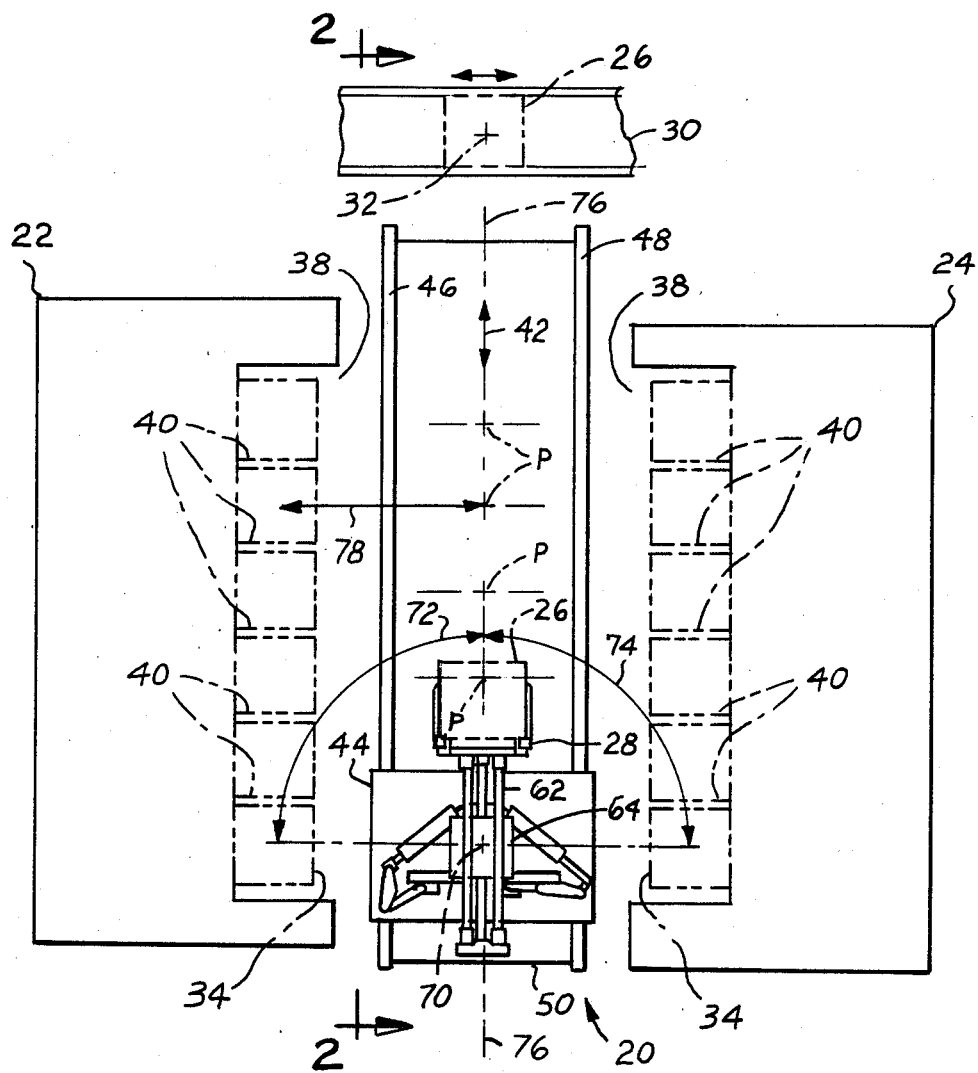
FIG. 1 is a top plan view of a robot embodying principles of the present invention shown in use in association with two storage units.
Figure 2:
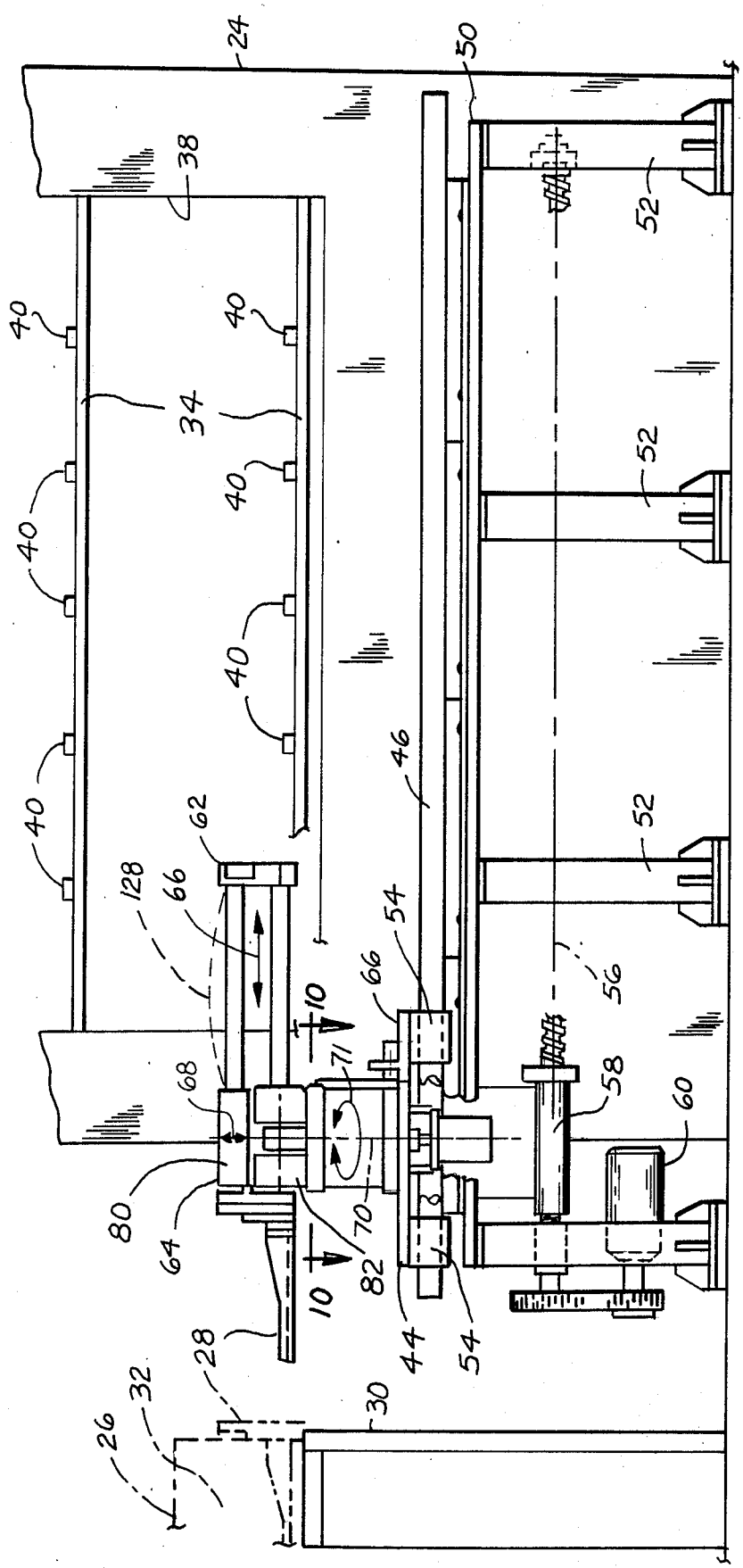
FIG. 2 is a partial elevational view looking generally in the direction of arrows 2—2 in FIG. 1, but on an enlarged scale and illustrating a different operative position.

FIGS. 1 and 2 illustrate the general organization and arrangement of a robot 20 embodying principles of the present invention. Robot 20 is illustrated in use in association with a storage/retrieval system and is disposed between two storage units 22 and 24. Both robot 20 and storage units 22, 24 are shown to be floor-mounted.

The illustrated usage, which itself constitutes certain aspects of the invention, involves the storage and retrieval of palleted articles 26. The palleted articles are shown to have generally rectangular shapes, and robot 20 comprises a suitable gripper mechanism 28 for grasping a palleted article 26.

The two storage units 22, 24 serve to store the palleted articles so that they can be retrieved when needed. Robot 20 serves both to move palleted articles into storage and also to retrieve stored articles from storage.

A pallet transport system 30 is disposed adjacent robot 20 and storage units 22, 24, and for example may comprise a conveyor. The illustrated configuration has a point of ingress to and egress from the storage/retrieval system which is designated by the general reference numeral 32. One palleted article 26 is shown in broken lines at the point of ingress and egress.

When an article at the point of ingress and egress 32 is to be stored, robot 20 operates to pick the palleted article from pallet transport system 30, to transport the article to a particular storage location in one of the two storage units 22, 24 and to place, or deposit, the article at that storage location.

When an article is to be retrieved from a stored location in one of the two storage units 22, 24, robot 20 operates to pick the article from its storage location, transport the article to pallet transport system 30, and place it on the pallet transport system.

The motion which is required to move a palleted article from a storage location to the point of ingress and egress, or vice versa, involves several independent motions. Robot 20 is capable of executing these independent motions with accuracy, speed and within the confined space between the two confronting storage units 22, 24. Moreover, robot 20 is capable of attaining such performance when moving palleted articles which have substantial weight extending even to as much as several hundred pounds. The independent motions may occur sequentially and/or concurrently. It is also possible for the robot to re-locate stored articles within the storage system.

With the capabilities of robot 20 having been generally explained, a more detailed description of storage units 22, 24 is now appropriate.

Figure 13:
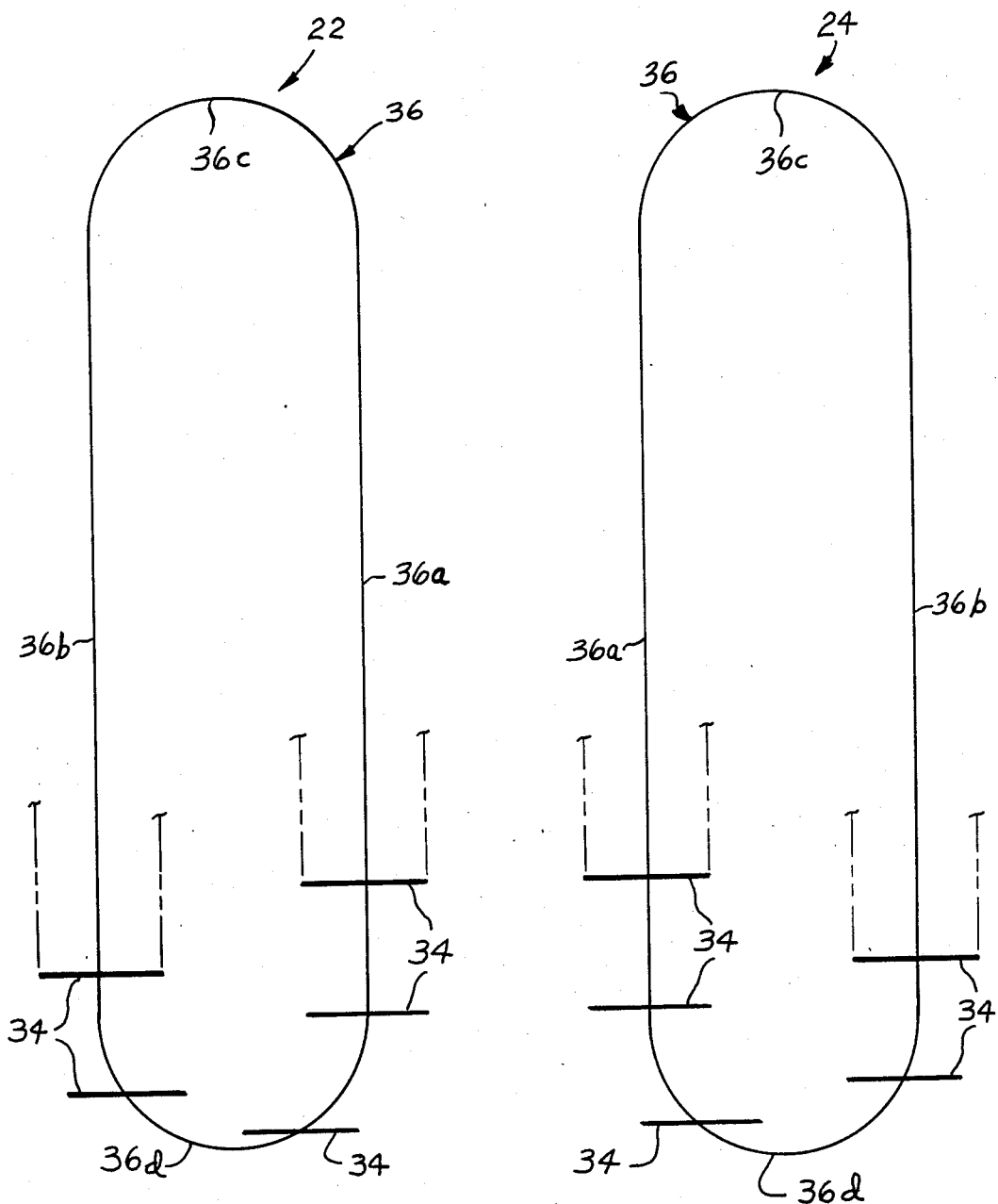
FIG. 13 is a schematic diagram illustrating the organization of the storage system of FIG. 1.

Storage units 22, 24 are essentially conventional known designs. As can be seen from consideration of FIGS. 1 and 2, each storage unit has a series of horizontal shelves 34 which are disposed at intervals along the length of an endless vertical track. The track and shelves are schematically depicted in FIG. 13 where the track is identified by the general reference numeral 36. The track may be considered to comprise two vertical segments 36a, 36b with semi-circular segments 36c, 36d at the ends of the vertical segments.

Each storage unit comprises a drive mechanism for moving the shelves in unison around the track, and the construction is such that the shelves remain substantially horizontal as they traverse the track. Accordingly stored articles placed on a shelf remain on the shelf as the shelves traverse the track.

The track segments 36a are at the fronts of their respective storage units, and from consideration of FIG. 1, it can be seen that the two storage units are arranged with their fronts facing each other across the space which contains robot 20. Each unit comprises a frontal opening 38 through which those shelves which are in vertical registry therewith are accessible for loading or unloading of articles. Each shelf 34 may be divided into a number of individual compartments for storage, and, in the illustrated embodiment, each shelf is divided into six such compartments for the rectangular shaped palleted articles 26. The compartments are formed by regularly spaced bars 40 affixed to the upper surface of the shelf.

From this description it can be appreciated that each storage unit 22, 24 is capable of storing a substantial number of articles, with the storage capacity of a unit determined by the number of shelves which it contains.

Indeed it is possible to construct storage units which have substantial height and concommitant storage capacity.

When an article is to be stored or retrieved, the appropriate shelf 34 is brought into registry with the opening 38 so that robot 20 has access to that shelf. Each storage unit comprises a suitable motorized control for moving the storage shelves around the vertical track. In an automated system it is possible for this to be computer controlled and for each storage location to be uniquely identified. Robot 20 is well-suited for such an automated storage and retrieval system.

With this brief description of the storage units, it is now appropriate to consider further detail of robot 20.

The robot is arranged for horizontal, longitudinal travel parallel to the lengths of the storage unit shelves, as indicated by the bi-directional arrow 42. For this purpose, the robot comprises a carriage 44 which is arranged for linear travel on a pair of parallel guides 46, 48 which are parallel to the direction of arrow 42. As can be seen in FIGS. 1 and 2, guides 46 and 48 are supported on a floor-mounted sub-structure 50 which comprises a series of spaced-apart uprights 52. Carriage 44 comprises bushings 54 at its four corners which serve to guide the carriage on guides 46, 48 for bi-directional linear motion.

A drive for imparting the linear motion to carriage 44 comprises an electric servo drive ball screw and recirculating ball nut. The ball screw is designated by the reference numeral 56, and it is disposed centrally of sub-structure 50 at a level below carriage 44 and parallel to arrow 42. The ball nut is designated by the reference numeral 58, and it is affixed to the underside of carriage 44. The electric servo drive is designated by the reference numeral 60 and appears in FIG. 2 at one end of sub-structure 50. A timing belt couples the servo to the screw.

With this arrangement, the operation of servo drive 60 is effective to rotate ball screw 56 and cause nut 58 to travel lengthwise of the ball screw. Because ball nut 58 is affixed to carriage 44, motion is imparted to carriage 44.

The use of a servo drive and ball screw and recirculating nut is desirable for achieving positioning accuracy in the travel of carriage 44 along guides 46, 48. The length of guides 46 and 48 is such that the robot can access all storage compartments of the two storage units as well as the point of ingress and egress 32.

Robot 20 further comprises an arm 62 which is supported on carriage 44. Gripper mechanism 28 is disposed at the distal end of arm 62. Arm 62 is supported and linearly movable on head 64 for horizontal bi-directional displacement in the direction of the arrow 66. In other words arm 62 can horizontally extend and retract on head 64 to thereby horizontally extend and retract gripper mechanism 28.

Head 64 is itself supported on carriage 44, but it is so supported as to be capable of executing bi-directional linear vertical motion indicated by the arrow 68, and to also be capable of executing rotary motion about a central vertical axis 70, as represented by the arrow 71. Thus, any rotary motion which is imparted to head 64 about axis 70 is also imparted to arm 62; similarly, any vertical motion which is imparted to head 64 is also imparted to arm 62. The particular construction is such that the linear motion of arm 62 in the direction of arrow 66 takes place along a radial relative to axis 70 while the particular radial is determined by the particular rotary position of head 64 about axis 70, and the particular elevation of the head. The construction is also such that the vertical head motion takes place relative to the carriage.

As will perhaps become more apparent from the ensuing detailed description, the motions which have just been described are all independent. In other words, the motion of carriage 44 in the direction of arrow 42 is one independent motion; the motion of arm 62 on head 64 in the direction of arrow 66 is another independent motion; the vertical positioning of head 64 relative to carriage 44 in the direction of arrow 68 is a third independent motion; and the rotary motion of head 64 on the carriage about axis 70 is a fourth independent motion. Accordingly, robot 20 may be considered as a four axis device, although certain principles of the invention are applicable not only to four axis devices but to devices having other than four axes.

For example vertical motion of the head in the direction of arrow 68 may be essential where the point of ingress and egress is at a different elevation from that of the access to a storage shelf. But if the point of ingress and egress were at the same elevation as that of the point of access to a storage shelf, a robot could be constructed without vertical motion capability.

The rotational range about axis 70 is depicted in FIG. 1 by the two reference numerals 72 and 74, which identify two 90° sectors to either side of the longitudinal direction indicated by arrow 42. In other words when the robot is moving an article between the point of ingress and egress 32 and storage unit 22, head 64 and arm 62 operate over sector 72; similarly when an article is to be moved between the point of ingress and egress 32 and storage unit 24, head 64 and arm 62 operate over sector 74. If an article were to be moved from one storage unit to the other, the robot would operate over both sectors 72, 74.

One of the significant features of the present invention is that the robot is capable of executing motions within the confined space between the two confronting storage units. The center line of the path of travel along the direction of arrow 42 is designated by the reference numeral 76. In order to move an article from pallet transport system 30 into a storage unit, the article must be displaced laterally a horizontal distance designated by the reference numeral 78 in FIG. 1. Robot 20 is capable of executing this displacement without interfering with the opposite storage unit, and therefore it is well adapted to operate in a confined space. The ability of arm 62 to extend and retract on head 64 assists in achieving this capability. It can also serve to shorten the overall length which might otherwise be required of guides 46 and 48 in order for the gripper mechanism to pick and place articles from and on pallet transport system 30. By way of reference to FIG. 2 it can be seen that when carriage 44 is at the end of travel on guides 46 and 48 adjacent pallet transport system 30, extending arm 62 on head 64 to the broken line position depicted in FIG. 2 enables gripper mechanism 28 to access the pallet transport system.

A representative operation of the robot in storing an article can now be described in more detail. With the robot in the broken line position of FIG. 2, the gripper mechanism 28 is operated to pick a palleted article from system 30 at the point of ingress and egress 32. The preferred motion sequence for moving a gripped article into a storage unit comprises first, a linear displacement in the direction of arrows 42 away from pallet transport system 30. This displacement is the result of a combination of travel of carriage 44 along guides 46, 48 and a retraction of arm 62 on head 64. The carriage travel stops at one of a series of stopping locations correlated with the article storage compartments in the storage units. There are six such locations in the illustrated embodiment. It is also preferred that the arm is fully retracted on the head at this time.

Next head 64 is rotated 90° in either one direction or the other, depending upon which of the two storage units is to receive the gripped article. After this rotary motion has terminated, arm 62 is extended to move the article into a storage compartment on the shelf which is accessible at the time, and when the article has been so positioned, gripper mechanism 28 is operated to release the article. The arm is then retracted.

The robot can then operate in a reverse sequence to return to the point of ingress and egress 32 for storing the next article. Alternatively it may perform a retrieval function and/or a relocation function of a stored article.

During the time that an article is being carried by robot 20 between the point of ingress and egress 32 and a storage location, or vice versa, there may be a vertical displacement of the head if system 30 and the storage shelf access are at different vertical elevations.

By arranging arm 62 such that its range of extension and retraction on head 64 corresponds to the dimension 78, and by locating the robot centrally between the two storage units, the two storage units may be disposed a minimum distance apart, thereby increasing the volumetric storage efficiency. Thus the robot is efficient in organization and arrangement while having the ability to move articles between the point of ingress and egress and the two storage units.

Figure 3:
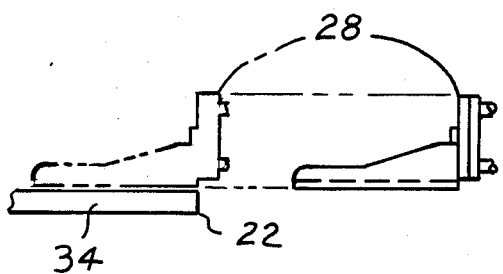
FIG. 3 is a partial elevation view of the robot of FIG. 1 but illustrating another operative position on an enlarged scale.
Figure 4:
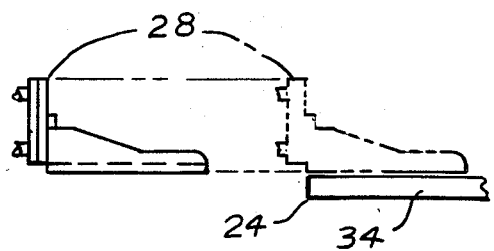
FIG. 4 is a partial elevation view of the robot of FIG. 1 illustrating still another operative position on an enlarged scale.

FIG. 3 illustrates respective extension and retraction positions of the arm on the head when accessing storage unit 22. Similarly FIG. 4 illustrates the respective extended and retracted positions of the arm on the head when accessing storage unit 24. In both figures the extended position is shown in broken lines and the retracted position in the solid lines.

Figure 7:
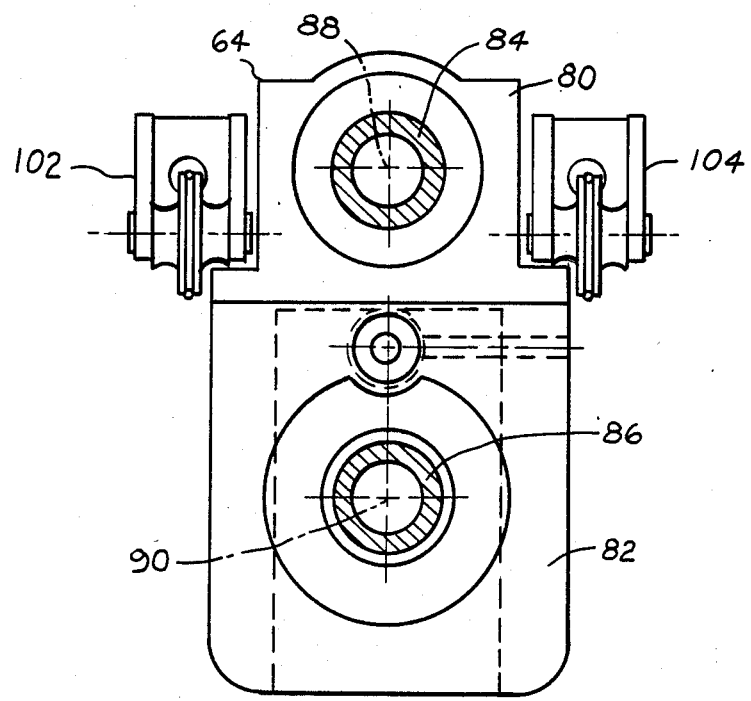
FIG. 7 is a transverse cross sectional view taken in the direction of arrows 7—7 in FIG. 6.

FIGS. 5, 6 and 7 illustrate more detail of arm 62 and head 64. Head 64 is an assembly of several individual parts. It may be considered to comprise an upper portion 80 which is supported on a lower portion 82. The two portions 80 and 82 comprise means for supporting and guiding arm 62.

Arm 62 comprises a pair of parallel circular rods 84, 86, and each is respectively supported and guided on the corresponding head portion 80 and 82 respectively for horizontal displacement relative to the head along respective axes 88 and 90. In other words, the axes 88 and 90 are parallel to the direction of arrow 66 which previously was mentioned as indicating the direction of displacement of the arm on the head.

Upper head portion 80 comprises a guide sleeve 92 for guiding arm rod 84, and lower head portion 82 comprises a pair of guide bushings 94, 96 at opposite ends which serve to guide arm rod 86.

The structure of arm 62 additionally comprises end pieces 98, 100. End piece 98 joins the two rods 84, 86 at the left-hand end as viewed in FIGS. 5 and 6, and end piece 100 joins the two rods at the right-hand end.

End pieces 98, 100 also provide for the mounting of a pair of cable cylinder mechanisms 102, 104 which are arranged on opposite sides of the arm's structure.

Each cable cylinder mechanism is essentially coextensive in length with arm 62. Details of a cable cylinder mechanism and its operative association with the head and arm will be described for cable cylinder mechanism 102 with the appreciation that cable cylinder mechanism 104 is essentially identically organized and arranged.

Cable cylinder mechanism 102 comprises a power cylinder 106. Pulleys 108 and 110 are disposed at opposite lengthwise ends of cylinder 106, and each pulley is suitably supported for rotation about a horizontal axis by means of a corresponding bracket 112, 114.

A cable portion 116 extends from one end of cylinder 106, trains essentially 180° around pulley 110, and extends back along the length of the cylinder in spaced relation to the cylinder's wall. The end of cable portion 116 attaches by means of a tensionable connection 118 to a bracket 120 on the lower head portion 82.

In similar fashion a second cable portion 122 extends from the opposite end of cylinder 106, trains essentially 180° around pulley 108, and extends lengthwise of cylinder 106 in spaced relation to the cylinder's wall to also attach to bracket 120 by a tensionable connection 124. The respective cable portions 116, 122 attach within cylinder 106 to a piston 126. The connections 118, 124 provide for a suitable tensioning of the cable; in this regard bracket 120 has apertured projecting flanges through which threaded members on the ends of the two cable portions pass. Nuts are screwed onto these threaded members at the ends of the cable portions to bear against the bracket flanges and set the cable tension.

Cylinder 106 has two ports which are communicated to a fluid power control system, preferably a pneumatic one. The cylinder of the other mechanism 104 is connected in parallel pneumatic circuit relationship with cylinder 106. The creation of a differential pressure condition across the ports of each cylinder acts on the corresponding piston to effect piston travel within the corresponding cylinder. Each piston in turn seeks to impart travel to its cable portions. By virtue of the particular constraints of the system, i.e. because of the cable attachment to head 64 and because rods 84, 86 can slide through head 64, the net result is that the two rods 84, 86, the two cable cylinders, and the two end pieces 98, 100 move as a unit relative to the head.

The construction and arrangement provides the arm with the ability to support a load throughout all positions over which it may be operated without any detrimental deflection. In the illustrated embodiment, the two rods are supported on the head along about ⅓ of their length.

In order to bring the fluid power to the cable cylinder mechanisms, flexible lines 128 are provided between head 64 and the left-hand end piece 98. When the arm is fully retracted on the head, these lines will be extended almost flat whereas when the arm is fully extended they will flex.

The gripper mechanism 28 attaches to end piece 100. The gripper mechanism comprises a mounting plate 140 which attaches to end piece 100, and may be considered generally perpendicular to length of the arm. Plate 140 serves to support a pair of tines 142 at opposite sides. The tines project forwardly of plate 140 in directions which are parallel to the length of the arm.

Each tine 142 is moveable toward and away from the other by means of a corresponding four-bar parallelogram linkage mechanism 144 via which the tine mounts on mounting plate 140. The four pivot axes of each four-bar parallelogram linkage mechanism 144 are identified by the reference numerals 146, 148, 150 and 152. The pivot axes 146, 148 lie on mounting plate 140, while the pivot axes 150 and 152 lie on tine 142.

A link 154 extends between the two pivot axes 146 and 150, and a link 156 extends between the two pivot axes 148 and 152. Moreover, link 156 extends beyond the rear face of mounting plate 140 to a point of pivotal connection 158 with the rod 159 of an actuating cylinder 160 which is fastened to the rear face of mounting plate 140.

The axis of cylinder 160 is disposed horizontally, but transverse the length of the tine. The illustrated solid line position shows rod 159 to be in the retracted position. In this position, tine 142 assumes its furthest outboard position.

Figures 8, 9:
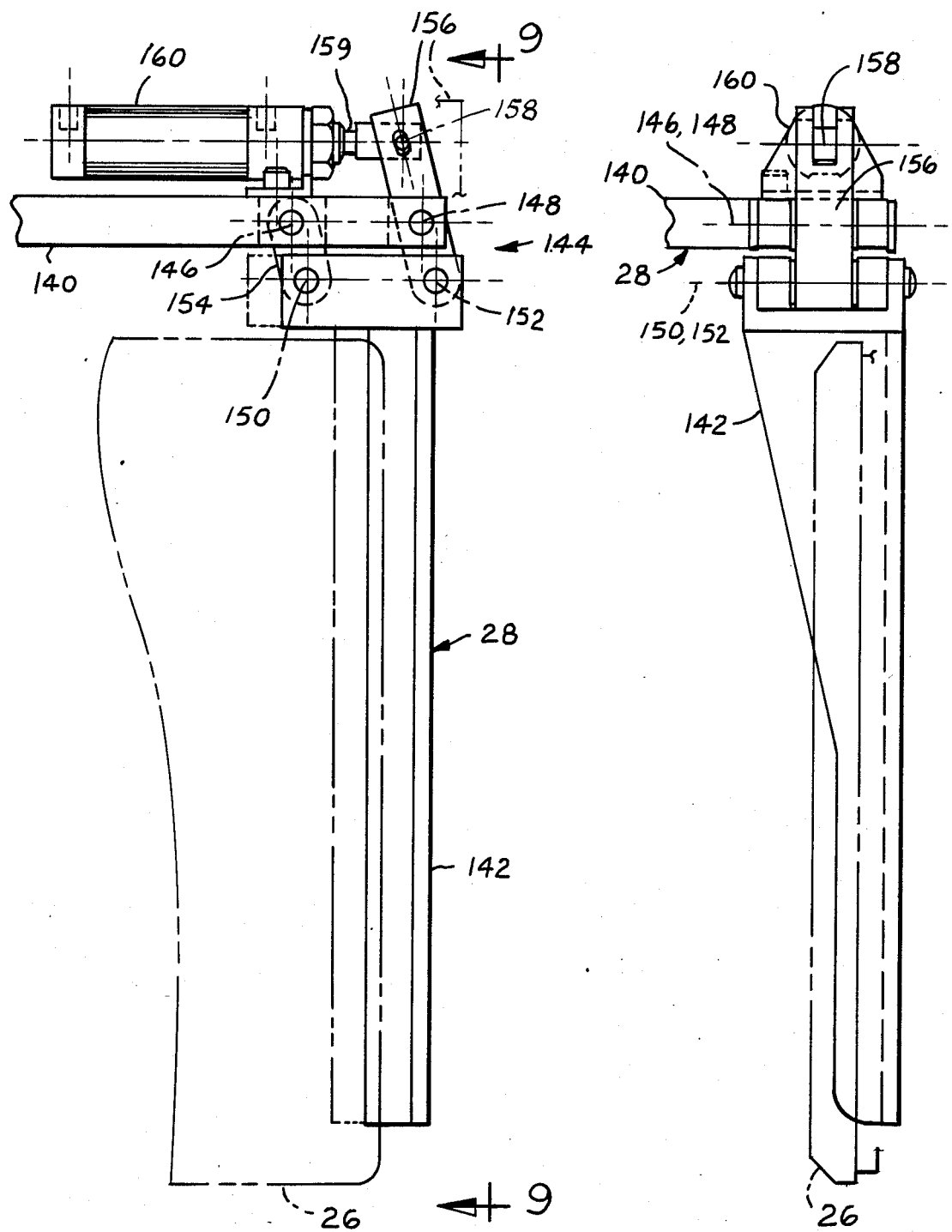
FIG. 8 is a top plan half view of a gripper mechanism which is attached to the robot arm, the omitted half being symmetrically opposite.
FIG. 9 is an elevational view taken in the direction of arrows 9—9 in FIG. 8.

When cylinder 160 is operated to extend rod 159, link 156 is operated in a clockwise sense to the broken line position as viewed in FIG. 8 and this causes the tine to be moved to its furthest inboard position while remaining parallel to the length of the arm.

The two cylinders 160 of the gripper mechanism are operated in unison so that with both retracted, the tines are spaced furthest apart enabling the gripper mechanism to fit around a pallet when the arm is aligned with and advanced toward the pallet. When the cylinder rods are then extended, the tines are urged inwardly to grip the pallet for transport by the arm. When a gripped pallet is to be released, the cylinder rods are again retracted.

As can be seen in FIG. 8, the lengths of the tines are made preferably just slightly less than the length of the pallet sides so as to provide support for the palleted articles over most of the length of the pallet.

Each tine has a channel-shaped section comprising a lower horizontal portion and a vertical side portion. When the tines are gripping a pallet, the pallet can rest on the lower horizontal portions while the vertical side portions laterally constrain the pallet. Thus, the tines are well-suited for the secure handling of palleted articles yet with the ability to readily grasp and release palleted articles. Pneumatic lines for the cylinders 160 can parallel the lines 128 between head 64 and end piece 98 and from there extend along the length of arm 62 to the cylinders.

Figure 11:
FIG. 11 is an elevational view of FIG. 10 looking in the direction of arrows 11—11 in FIG. 10.
Figure 11:
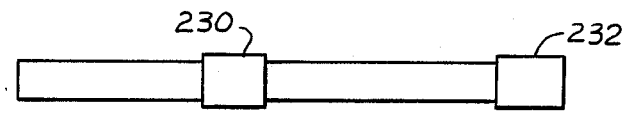
Figure 11:
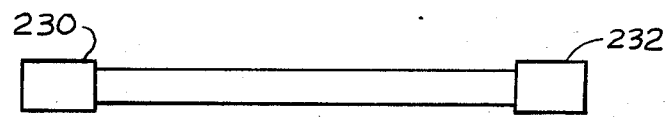
Figure 10:
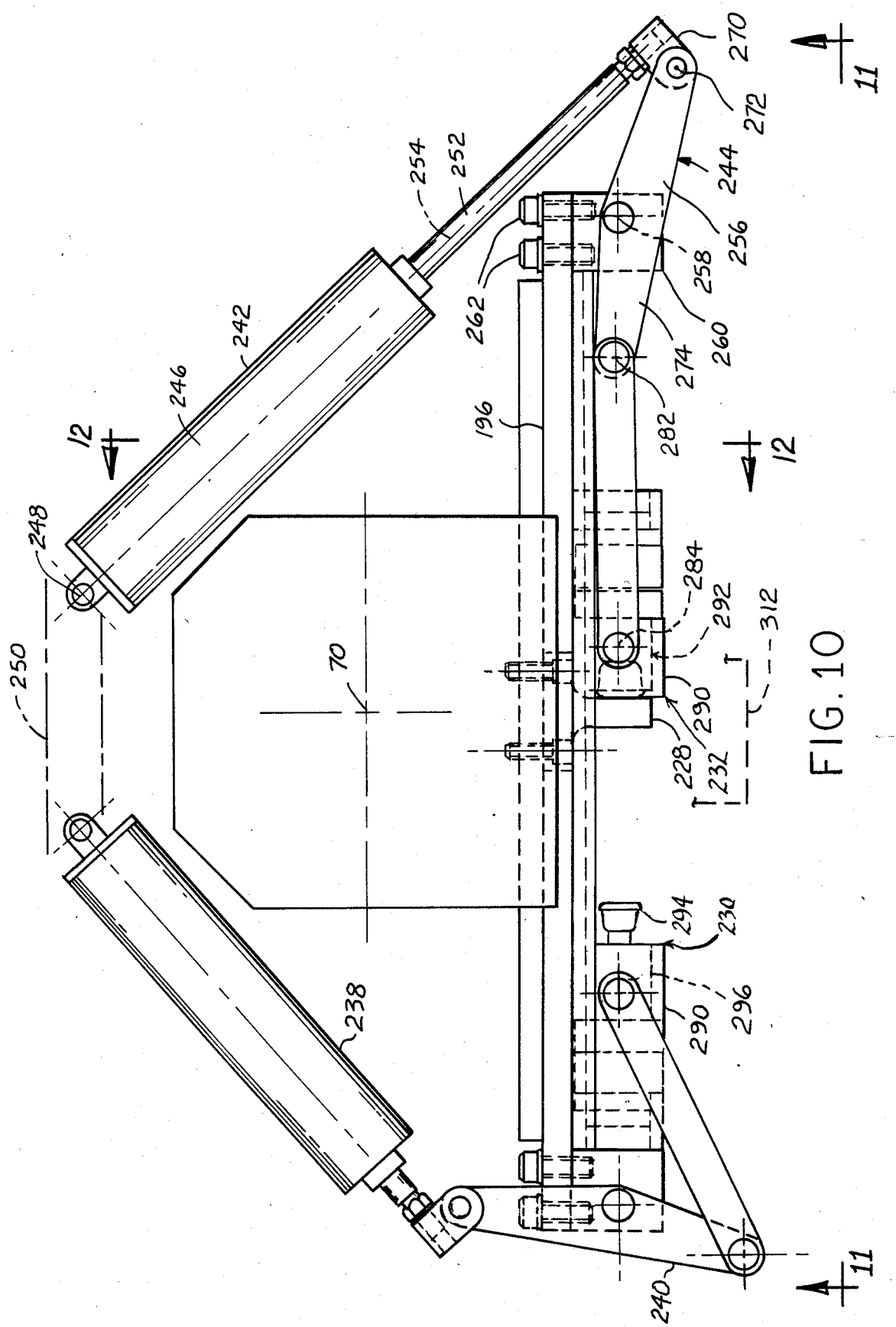
FIG. 10 is a plan view of another portion of the robot illustrating further detail, and is taken generally in the direction of arrows 10—10 in FIG. 2 and enlarged.
Figure 11:
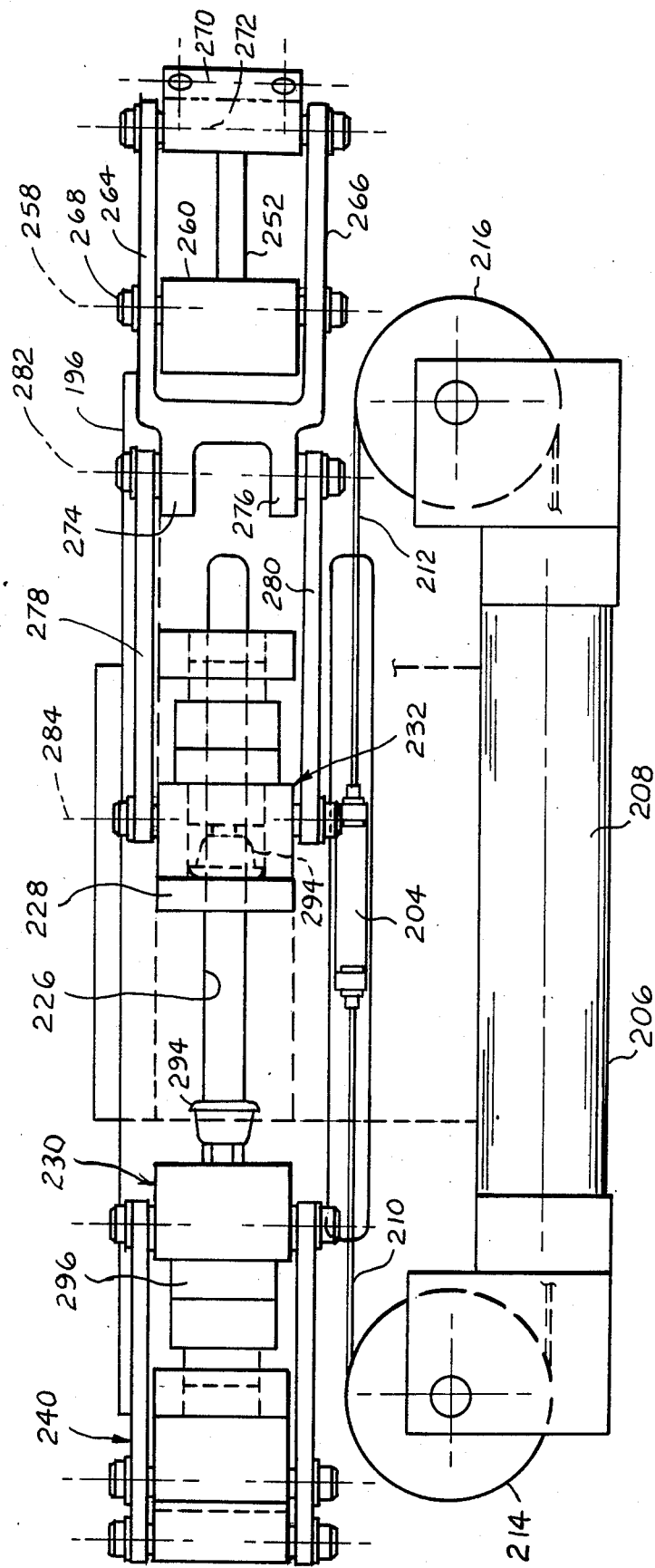
Figure 12:
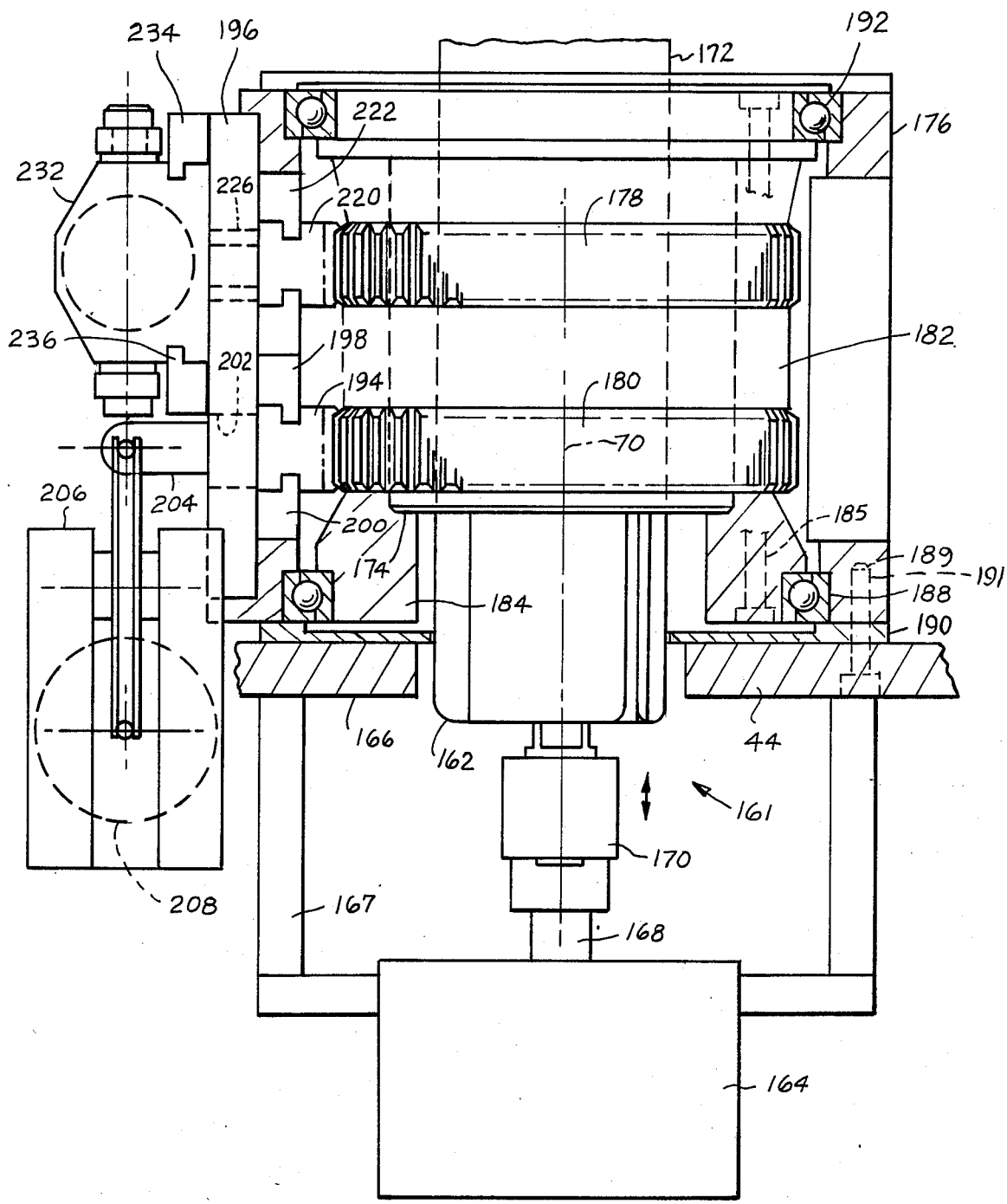
FIG. 12 is a cross sectional view taken generally in the direction of arrows 12—12 in FIG. 10.

Attention can now be directed to FIGS. 10, 11 and 12 which show details of how head 64 is supported on carriage 44 and to details of the additional mechanism for imparting both rotary motion to the head about vertical axis 70 and also vertical motion to elevate and lower the head.

Head 64 is supported on carriage 44 by a mechanism 161 which provides for the vertical elevating and lowering of the head relative to the carriage and also for imparting rotary motion to the head about axis 70. Mechanism 161 includes a ball spline shaft and bearing coupling, 162 generally, and a power cylinder 164. Carriage 44 comprises a horizontal rectangular shaped table 166, and the body of cylinder 164 is disposed below table 166, and securely mounted thereon by a mount 167.

Cylinder 164 comprises an extensible and retractable rod 168, and the cylinder is arranged so that rod 168 is disposed with its axis coincident with vertical axis 70. The free end of rod 168 is coupled with coupling 162 by a rotary joint 170, and the axis of rotary joint 170 and that of coupling 162 are all coincident, lying on vertical axis 70.

The ball spline bearing and shaft coupling 162 comprises a shaft portion 172 and a bearing portion 174, and it is a conventional, commercially available component.

The nature of a ball spline shaft and bearing coupling is such that the shaft and bearing portions are coupled together for rotation in unison, but the shaft portion can be displaced axially with respect to the bearing portion while the two remain rotationally coupled. Moreover, the nature of the rotational coupling is a precision one whereby there is essentially no backlash.

Mechanism 161 further includes means for journaling coupling 162 on carriage 44 for rotary motion about vertical axis 70. The journaling structure, 176 generally, serves to act on bearing portion 174. Rotary joint 170 serves to prevent rotary motion of coupling 162 from being transmitted to rod 168 of cylinder 164. The nature of the journaling of coupling 162 on structure 176 is such that bearing portion 174 is axially captured so that it is incapable of any vertical motion. Extension and retraction of cylinder rod 168 is however effective to displace shaft portion 172 vertically with respect to bearing portion 174.

Head 64 attaches to the upper end of shaft portion 172, and therefore by virtue of the organization and arrangement, the vertical motion which is imparted to shaft portion 172 by the extension and retraction of cylinder rod 168 is effective to elevate and lowerate the head. Likewise rotary motion imparted to bearing portion 174 will be effective to impart rotary motion to the head by virtue of the coupling with shaft portion 172. The two motions can be independently imparted to the head.

The circular pinions 178 and 180 are disposed around the outside of and are securely affixed to bearing portion 174. The two pinions 178 and 180 are spaced vertically apart by a circular spacer member 182 and they are concentric with axis 70.

A lower circular support ring 184 is disposed against the lower face of pinion 180 and attaches by means of a series of screws 185 which pass through aligned apertures in ring 184 and pinion 180 to engage tapped holes in spacer member 182. Ring member 184 is in turn supported by a circular lower ball bearing assembly 188 at the lower end of a generally cylindrical journal housing structure 189. The outer race of bearing assembly 188 is held in place on structure 189 by a retention ring member 190 while the inner bearing race supports ring 184. Structure 189 is attached to table 166 by screws 191.

In an analogous manner the upper end of bearing portion 174 is journaled on structure 189 by a similar type of arrangement, including an upper circular ball bearing assembly 192.

Therefore, it can be appreciated that bearing portion 174 is journaled at vertically spaced apart locations so that the combined load of the arm and any palleted article which is being transported is reacted on structure 189 by the two ball bearing assemblies 188 and 192. With this arrangement it is possible to operate the arm, and any load which it may be carrying with accuracy because the load is reacted via the bearing assemblies to the cylindrical journal housing structure 189 and in turn transmitted onto table 166 on which structure 189 is uprightly supported.

Rotary motion is imparted to coupling 162 via pinion 180. A gear rack 194 is disposed tangential to and in meshing engagement with pinion 180. Gear rack 194 is guided for bi-directional linear motion tangential to pinion 180 along an axis which is perpendicular to the plane of the sheet containing FIG. 12.

Gear rack 194 is supported on a vertical plate 196 by means of an upper guide member 198 and a lower guide member 200 which serve to guide the gear rack for its linear motion. Vertical plate 196 is securely mounted on the support structure. A horizontal slot 202 is provided in plate 196 vertically between guide members 198 and 200. An operator 204 projects from gear rack 194 through slot 202.

Operator 204 is operatively coupled with a cable cylinder mechanism 206 which is like the cable cylinder mechanisms described earlier in connection with arm 62. Cable cylinder mechanism 206 comprises a cylinder 208 whose axis is arranged parallel to the travel of gear rack 194. Cable portions 210 and 212 extend from opposite ends of cylinder 208 and train around respective pulleys 214 and 216 to connect to operator 204 via tensionable connections. Creation of fluid pressure differential across the ports of cylinder 208 is effective to impart motion to gear rack 194 via operator 204 because cylinder 208 is securely attached to carriage 44. By virtue of the coupling of gear rack 194 with pinion 180, the operation of cable cylinder mechanism 206 is consequently effective to impart rotary motion to the head 64.

A second gear rack 220 is supported on plate 196 by guide members 222 and 224 for bi-directional linear motion parallel to, and directly above, gear rack 194. Gear rack 220 is disposed tangent to and in meshing engagement with pinion 178. Plate 196 is provided with a second horizontal slot 226 parallel to slot 202 and disposed vertically between the two guide members 222 and 224. An abutment member 228 passes through slot 226 from a central location along the length of gear rack 220. With this arrangement, it will be appreciated that gear rack 220 is operated by pinion 178 in response to the impartation of rotary motion to pinion 180 by gear rack 194.

A pair of abutment stops 230, 232 are disposed on plate 196 for cooperative association with abutment member 228. As viewed in FIGS. 10 and 11, each abutment stop is disposed for operation along a corresponding range of linear travel parallel to the travel of gear racks 194, 220.

FIGS. 10 and 11 show abutment member 228 in abutment with abutment stop 232, and in this position, gear racks 220 and 194 are at the midpoints of their respective ranges of linear travel. This corresponds to the arm 62 being in the rotary position depicted by the solid lines in FIGS. 1 and 2, i.e. the twelve o'clock position in FIG. 1 pointing toward ingress and egress point 32.

Abutment stop 230 is illustrated as being spaced to the left of abutment member 228 in FIGS. 10 and 11, and if cable cylinder mechanism 206 is now operated to move gear rack 194 to the left as viewed in FIGS. 10 and 11, the result is that clockwise motion is imparted to coupling 174 about axis 70 to produce clockwise motion of the head and arm about axis 70 toward the three o'clock position as viewed in FIG. 1. Gear rack 220 is displaced essentially in unison with the displacement of gear rack 194 so that abutment member 228 leaves abutment with abutment stop 232 and travels toward the other abutment stop 230 as the head and arm rotate toward the three o'clock position.

The abutment of abutment member 228 with abutment stop 230 prevents any further leftward displacement of gear rack 220 and in turn arrests the rotary motion of the head and arm. Thus stop 230 is a control for the rotary positioning of the head and the arm in the clockwise sense. The abutment stop 232 provides an analogous control for motion in the counterclockwise sense.

The illustrated position of stop 230 in FIGS. 10 and 11 arrests the rotary motion when the arm has been swung 90° in the clockwise sense from the solid line position of FIGS. 1 and 2, corresponding to the arm having swung over sector 74 to access storage unit 24.

The two stops 230, 232 are guided for linear motion parallel to the linear motion of gear rack 220 by means of respective guides 234, 236 attached to plate 196 on the opposite side from the two gear racks. Each stop is selectively positionable by means of a corresponding fluid cylinder and toggle mechanism. For stop 230, the associated cylinder and toggle mechanism are identified by the reference numerals 238 and 240 respectively, while for stop 232, the corresponding cylinder toggle mechanism are identified by the reference numerals 242 and 244 respectively. Although each stop operates along a linear path of travel, it is intended, in the illustrated operation of the disclosed embodiment of robot, to be positioned either at one or at the other of its limits of linear travel.

Each cylinder and toggle mechanism combination is essentially symmetrically opposite in configuration to the other, and therefore only cylinder 242 and toggle mechanism 244 will be described in detail.

Cylinder 242 comprises a main cylinder body 246 whose head end is clevis-mounted at 248 on a suitable mounting structure 250 which is attached to the support structure. Cylinder 242 further comprises a rod 252 which is extensible and retractable along the cylinder's axis 254. A crank 256 is mounted for pivotal motion about a vertical axis 258 on a rectangular block 260 which is fastened to the end of plate 196 by screws 262. Crank 256 comprises vertically spaced apart crank arm portions 264 and 266 which allows it to fit onto block 260 and a pivot 268 to pass through aligned apertures in both to provide the pivotal mounting of the crank on block 260 about axis 258.

The free end of cylinder rod 252 is attached by a pivot connection 270 to the distal ends of crank arm portions 264 and 266. This enables pivotal motion between the crank and the cylinder rod to occur about a vertical axis 272.

Crank 256 also has shorter vertically spaced apart arm portions 274 and 276 on the opposite side of axis 258 from arm portions 264, 266. A pair of links 278 and 280 extend from portions 274 and 276 to stop 232. Pivot joints connect links 278 and 280 at one end to crank arm portions 274 and 276 so that pivotal motion can occur about vertical axis 282. The opposite ends of links 278 and 280 connect via pivot connections to stop 232 so that there can be pivotal motion about vertical axis 284 between the links and the stop.

With the cylinder rod 252 extended, as in the position shown in FIG. 10, crank 256 is operated to its clockwisemost position about axis 258. This is effective to dispose links 278 and 280 substantially parallel to the direction of linear displacement of stop 232 along its axis of travel, and preferably with a slight amount of over-center travel in the toggle mechanism. This corresponds to the extended position of stop 232.

Retraction of cylinder rod 252 is effective to operate crank 256 in the counterclockwise sense about axis 258, and this in turn causes stop 232 to be displaced to the right in FIGS. 10 and 11. Cylinder rod 252 retracts until stop 232 abuts block 260 to prevent any further travel of the stop to the right, as in FIGS. 10 and 11. At that time the cylinder and toggle mechanism assumes an orientation analogous to that depicted by cylinder 238 and toggle 240 in FIGS. 10 and 11.

Each abutment stop 230, 232 preferably possesses a shock-absorbing capability and a fine adjustment capability. These capabilities are embodied by constructing each stop to have a main stop body 290 which has grooves for engagement by guides 234, 236. Links 278 and 280 have pivotal connection to the corresponding abutment stop at its main stop body.

Each main stop body further comprises a threaded circular aperture concentric with the direction of travel, and a shock-absorbing stopping device 292 is threaded into this threaded aperture. The shock-absorbing stopping device is a conventional, commercially available, component. Briefly it comprises a plunger 294 which in the free position of the device projects from a body portion 296. The body portion 296 threads into the circular aperture of the main stop body 290.

The 294 plunger of stop 230 projects to the right when in the free position. As abutment member 228 travels toward the left as viewed in FIGS. 10 and 11 it will first contact plunger 294. The plunger acts to absorb, or cushion, the impact until it finally bottoms out at a final stopping position which prevents any further motion of the abutment member against it. By incorporation of this shock-absorbing feature, high impact loads are avoided, yet the device has the ability to establish a final accurate stopping position of abutment member 228. By providing the threaded mounting of the shock-absorbing device body within the main stop body, the shock-absorbing device can be rotated within the threaded aperture of the main stop body to set its axial position in relation to the main stop body. This enables the stopping location to be precisely set. Once the desired setting has been obtained, the adjustable stopping device is locked in place by any suitable means, such as jam nuts.

The other stop 232 has a similar type of adjustable shock-absorbing stopping device which performs and can be set in the same manner.

With the foregoing description in mind, the reader's attention can now be directed to more consideration of more specific details of the operation of the robot mechanism during typical sequences for loading, unloading and/or repositioning articles within the storage and retrieval system.

FIGS. 11A, 11B, and 11C illustrate schematically three basic sets of operating positions of abutment stops 230 and 232.

FIG. 11A corresponds to the position shown in the mechanical drawings of FIGS. 10 and 11 wherein abutment stop 230 occupies its retracted position and abutment stop 232 it extended position. For this particular position of the two abutment stops 230, 232, the range of travel of abutment member 228 is restricted to the left-hand half of its total range of travel, and gear rack 220 is similarly restricted. This restricted range of travel of abutment member 228 and gear rack 220 corresponds to the arcuate rotational range of travel of arm 62 and head 64 identified by the 90° sector 74 in FIG. 1

FIG. 11B depicts a repositioning of the two abutment stops 230, 232 with the former now in its extended position and the latter in its retracted position. Abutment member 228 is now restricted to operation along the right-hand half of its range of travel, and gear rack 220 is similarly restricted. Operation of gear rack 220 and abutment member 228 over this right-hand half of its range of travel corresponds to a rotary range of travel of arm 62 and head 64 over the 90° sector 72 in FIG. 1. In other words for the particular positions of the two abutment stops in FIG. 11B, abutment of abutment member 228 with stop 230 corresponds to arm 62 being in the twelve o'clock position as viewed in FIG. 1, and if counterclockwise motion is now imparted to the head and arm about vertical axis 70, gear rack 220 and abutment member 228 travel to the right as viewed in FIG. 11B until the travel of abutment member 228 is arrested by stop 232 with arm 62 then being in the nine o'clock position.

FIG. 11C illustrates both abutment stops 230, 232 in their retracted positions. Arm 62 is now capable of operating over a full 180° of rotation between the three and nine o'clock positions.

In order to assure that abutment stops 230 and 232 set the desired positioning of the arm when abutted by abutment member 228, mechanism 161 is configured so that cable cylinder mechanism 206 can impart somewhat more than 180° of rotation, beyond both the nine and three o'clock positions. Thus, when either abutment stop is in its retracted position and arresting the travel of abutment member 228, it is being forcefully abutted by the abutment member by virtue of the force exerted from cylinder 208 of cable cylinder mechanism 206. In other words when either of the abutment stops is functioning to stop abutment member 228, the abutment member is being forcefully urged against the abutment stop so that the arm is being forcefully constrained against rotation in the desired rotary position. Because the cable cylinder mechanism operates to continue to apply force to the abutment member as the abutment member assumes operative engagement with one of the abutment stops, the inclusion of the shock-absorbing stopping device is desirable.

The slight overcenter operation of each toggle mechanism when the corresponding abutment stop is operated to the extended position is also beneficial. This serves in effect to lock the abutment stop in its extended position so that when abutted by abutment member 228, the abutment force is reacted via the toggle and against block 260 to avoid any tendency for the force to be reacted in a manner which might urge the corresponding cylinder rod 252 in the direction of retraction. Of course when the cylinder rod 252 is retracted, the retracted position of the corresponding abutment stop is defined by its own abutment with the corresponding block 260. In other words each block 260 serves to define the retracted position of the corresponding abutment stop, and in this regard the toggle and cylinder mechanism is configured to insure that when the cylinder rod 252 is retracted the corresponding abutment stop abuts the corresponding block 260 before the cylinder rod bottoms out.

While there are various possible ways to set the stopping locations in the illustrated robot, and this is in reference to the nine o'clock, the twelve o'clock, and the three o'clock positions of the arm as viewed in FIG. 1, the symmetry of the mechanism about the vertical plane 310 which passes through vertical axis 70 in FIG. 10 can be used to advantage. By endowing each abutment stop 230, 232 with a range of linear travel corresponding to slightly more than 90° of arm rotation, it is possible to precisely set the nine o'clock and three o'- clock positions and then to rely upon the symmetry of the mechanism to define the twelve o'clock position. In other words with abutment member 230 in the retracted position the mechanism can be operated to bring abutment member 228 into abutment therewith. The corresponding adjustable shock-absorbing device 292 is adjusted with respect to the corresponding main stop body 290 to precisely establish the nine o'clock position. The analogous procedure may be used to precisely set the three o'clock position. The twelve o'clock position is therefore inherently defined.

The reader should by now appreciate that the robot possesses a very precise rotational control for its arm in a compact and efficient organization and arrangement of component parts so as to be capable of fitting within the confined space between two confronting storage units and serving both storage units and the pallet transport system.

It is to be observed that the entire control mechanism for the adjustable stops 230, 232 is essentially organized around the journal structure 176 for supporting head 64. The axes of the two cylinders 238, 242 may each be considered to lie on one side of an imaginary triangle while the axis of linear travel of the two stops 230, 232 lies on the third side of such an imaginary triangle, and that such an imaginary triangle bounds the vertical axis 70 as viewed in plan.

Horizontal compactness is enhanced by the illustrated arrangement which has the cable portions of cable cylinder mechanism 206 occupying a vertical plane which passes through the axes of linear travel of stops 230, 232. It would however be possible to make a modification wherein the cable is arranged in a horizontal plane, for example by repositioning the entire cable mechanism 206 90° in the clockwise sense about its point of connection with operating member 204 as viewed in FIG. 12.

Details of the operation of robot 20 will now be described for picking a palleted article 26 from transport system 30 and placing it in one of the storage compartments of storage unit 24. Let it be assumed that the robot arm is in the twelve o'clock position of FIG. 1 and fully extended so that gripper mechanism 28 is engaged with a palleted article 26 on transport system 30. Furthermore let it be assumed that the two abutment stops 230, 232 are in the FIG. 11A position with cable cylinder mechanism 206 urging abutment member 228 against stop 232. Let it also be assumed that the vertical position of head 64 is appropriate for the height of transport system 30, and that the appropriate shelf 34 is at the access opening 38 in the storage unit.

Based upon this assumed initial condition, cylinders 160 are operated to cause gripper mechanism 28 to forcefully grip the pallet. With the pallet forcefully gripped, drive 60 is operated to cause carriage 44 to begin traveling along guides 46, 48. There are a number of discrete stopping positions P for carriage 44 corresponding to the compartments of shelves 34. (For the six-compartment storage units, there are six such stopping locations P.) Carriage 44 continues in its travel until it reaches the appropriate stopping location P for the particular storage compartment on which the grasped palleted article is to be placed.

With the two storage units disposed the minimum spacing distance apart, arm 62 should be operated from its extended position to its retracted position before rotary motion is imparted to it. The retraction of arm 62 on head 64 may take place concurrently with the travel of carriage 44 along guides 46, 48 in order to minimize the time required. It is to be observed that while simultaneous motions may be preferred, the motions may be performed one-at-a-time, rather than concurrently.

With carriage 44 having now been stopped at the appropriate stopping location along guides 46, 48, and with arm 62 now having been fully retracted on head 64, rotary motion is imparted to the head by operation of cable cylinder mechanism 206.

The operation of cable cylinder mechanism 206 serves to move gear rack 194 to the left as viewed in FIGS. 10 and 11 thereby causing arm 62 to swing over the arc 74. The final rotary position of the arm is determined by the abutment of member 228 with stop 230. The palleted article is now in alignment with a particular vertical row of storage compartment locations except for the question as to whether any elevation or lowering is required to be imparted to the head to take into account any elevational difference between the shelf at opening 38 and pallet transport system 30. If there is such an elevational difference, the head and arm may be either elevated or lowered, as the case may be, to bring the palleted article into an appropriate vertical position for placement on the shelf compartment. Any required vertical motion may be imparted concurrently with other motions or it may be conducted only after other components of motion have been executed.

With the palleted article now in alignment with the particular storage location where it is to be stored, arm 62 is operated from the retracted to the extended position. In the extended position of the arm, the palleted article overlies the shelf and at this time gripper mechanism 28 releases the palleted article onto the shelf. With the gripper mechanism still released, the arm is retracted thereby clearing the gripper mechanism from the article so that the arm can now execute the motions.

By positioning the two storage units such that axis 70 is equidistant from the two storage units throughout the range of carriage travel, and by setting the range of travel of the arm between its fully extended and fully retracted positions equal to the distance 78, maximum volumetric storage efficiency is obtained for the particular robot.

With the robot arm having been retracted to clear the article which it has just stored, it may then go on to perform other tasks, such as picking a new article from transport system 30. If such is in fact the next task to be performed, then the motion which is imparted to the arm may follow the reverse sequence from that just described.

Alternatively if the robot were to remove or relocate an article from or within storage unit 24 the robot can remain in the three o'clock position and the carriage repositioned along its length of travel as may be required in order to access the particular palleted article which is to be moved. The particular storage units herein described comprise a number of storage shelves, and therefore in the illustrated storage system, each storage unit would have a total number of storage compartments equal to six times the number of shelves. In accessing any particular storage location there may be the necessity to operate the storage unit to bring the appropriate storage shelf around the track to a location where it is present for access by the robot arm through the frontal opening 38 in the storage unit.

As noted above, this robot and storage system is well suited for automated, computer-controlled type operation whereby each storage location may be uniquely identified and accessed as required by a combined computer control of the robot and of the storage unit mechanisms for operating the shelves along the closed vertical tracks.

Because the number of storage shelves in any storage unit will be a function of the size of the unit, it is contemplated that units of substantial height may be used with the robot without any need to change the configuration of the robot. In other words the robot itself need not have the ability to vertically traverse the full height of the storage unit and at most any vertical travel need is merely enough to take into account any discrepancies in elevation between the storage units and the pallet transport system.

When the robot operates to pick a palleted article from pallet transport system 30 and place it in one of the compartments in the other storage unit 22, the operating sequence is analogous to that described above for moving an article into storage unit 24, except that the rotation of the robot arm takes place over sector 72 instead of sector 74. For such operation, abutment stops 230, 232 will occupy the positions illustrated in Fig. 11B. Retrieval of a stored palleted article from storage unit 20 and a placement thereof on pallet transport system 30 will involve a reverse sequence of operations. Given the foregoing detailed description of placement between system 30 and storage unit 24 a detailed description for transport between system 30 and storage unit 22 is not seen to be required.

In some circumstances it may be appropriate to relocate a stored article from one storage unit to the other. This capability is available when the abutment stops are in the position depicted by Fig. 11C, in other words both abutment stops retracted. In such a condition it is possible for the robot arm to swing a full 180° traversing both sectors 72 and 74.

In performing this sort of relocation a gripped article will first be withdrawn from the shelf by the retraction of arm 62 on head 64. Once the arm has been fully retracted, the head is rotated 180°. Any relocation of the carriage to a different position along its length of travel is performed and this may be accomplished concurrently with the rotation of the arm in order to maximize the speed at which the relocation is performed. Once the gripped article is in alignment with its new storage location the arm is fully extended, and then the gripper is operated to release the article. The arm is finally retracted to enable the gripper mechanism to clear the palleted article and shelf.

In view of the foregoing it is believed that a fully enabling description of the various operational capabilities of the robot has been disclosed. Obviously there is some latitude in any particular operating sequence depending upon the nature of any particular storage system. Moreover it will be appreciated that principles of the invention are applicable to other than the storage of articles which are supported on rectangular shaped pallets. The usage of rectangular shaped pallets in this disclosed application is important because it demonstrates the ability of the robot to store and retrieve relatively heavy loads within a confined space and with accuracy.

The use of pneumatic powered cylinders for the control of all motion except for the travel of carriage 44 along guides 46, 48 is also advantageous since pneumatic power is a clean, conventionally available power source. Pneumatic devices are less prone to problems, typically associated with hydraulically operated devices such as leakage, but it is to be appreciated that other than pneumatic-powered cylinders could be utilized in practice of broader aspects of the invention.

Various pneumatic lines and electrical conduits can also be neatly organized and arranged on the robot while having the ability to follow the various motions. This was explained earlier in connection with the pneumatic lines extending from the head to the arm. It is also the case for the connection of lines between the table and the head. A manifold block 312 (in phantom in FIG. 10) may be attached to abutment member 228 and contain connection points for lines which extend from the table to the manifold block and from the manifold block to the head. Since the block will travel lengthwise to the right and left as the head rotates, the lines are well-adapted to following the rotary motion of the head. They are also adapted to follow the vertical displacement of the head over the illustrated range of vertical travel which in this instance amounts to the difference in elevation between the pallet transport system and the level of access to the storage shelves through the storage unit access openings.

The robot comprises an associated control system which performs the sequence of functions described above. The control system can be fabricated in accordance with conventional design practices to enable the robot to perform the motion sequences which have been described. In this regard it may be desirable to include certain sensors in association with various parts of the mechanism in order to provide information to the control system. For example, this could be positional control information which may be used in control of the particular operating sequences of the various motions.

As will be seen in the ensuing claims, the inventive aspects relate not only to the robot per se but also to its association with the storage and retrieval system. While a preferred embodiment has been disclosed, it will be appreciated that principles are applicable to other embodiments.

What is claimed is:

1. A pick and place type robot comprising an arm having a gripper for articles to be picked and placed by the robot, a head on which said arm is supported, means for supporting said head for rotary motion about a vertical axis, and a drive mechanism for imparting rotary motion to said head about said vertical axis comprising a driving means which is operable to produce a range of rotary motion of said head about said vertical axis, a driven means which is driven by said driving means and is operatively coupled with said head such that operation of said driving means causes said driven means to operate said head over said range of rotary motion, and means for defining particular rotary positions of said head at which said arm and gripper are to pick and place articles comprising a driven member which is driven along a given path in direct correlation with rotary motion of said head about said vertical axis, a pair of abutment stops disposed to limit the travel of said driven member by abutment therewith, one abutment stop limiting travel in one direction along said given path and the other abutment stop limiting travel in the opposite direction along said given path, each of said stops being independently positionable to plural positions defining particular rotary positions of said head about said vertical axis at which said arm and gripper pick and place articles, said driven member being arranged to execute linear travel along said given path and each of said abutment stops being arranged to be linearly positionable along a linear path of adjustment which is parallel to the linear travel of said driven member along said given path, each of said abutment stops being selectively positionable along its linear adjustment path by a linear actuator which operates the corresponding abutment stop via a corresponding toggle mechanism.

2. A robot as set forth in claim 1, in which each linear actuator lies on a corresponding axis along which it acts to position the corresponding abutment stop and each abutment stop's linear adjustment path is along a corresponding linear axis of adjustment, and each actuator is so arranged in relation to the linear adjustment path of the corresponding abutment stop that the axis of the actuator and the axis of the linear adjustment path of the corresponding stop define an angle which subtends said vertical axis as viewed in the direction of said vertical axis.

3. A robot as set forth in claim 2 in which the axes of said linear actuators form two sides of an imaginary triangle, the linear axis of adjustment of said stops forms the other side of said imaginary triangle, and said vertical axis is enclosed by said imaginary triangle as viewed in the direction of said vertical axis.

4. A robot as set forth in claim 1 in which each abutment stop comprises a main body which is positionable along the corresponding path of adjustment, and each main body contains a corresponding shock-absorbing device which is disposed to be abutted by an abutting portion of said driven member to shock-absorb the abutment over a final increment of travel of said driven member toward a final stopped position of said driven member by the abutment stop.

5. A robot as set forth in claim 1 in which each abutment stop is selectively operable to two positions and one of said two positions of each abutment stop defines the same rotary position of said arm about said vertical axis.

6. A robot as set forth in claim 5 in which said abutment stops are so arranged and selectively operable that said arm is capable of rotating 90° from a central position in either direction.

7. A robot as set forth in claim 1 in which said driving means comprises a linearly operable gear rack and said driven means comprises a pinion concentric with said vertical axis, said gear rack meshing in driving engagement with said pinion such that linear operation of said gear rack imparts rotary motion to said pinion and said head about said vertical axis.

8. A robot as set forth in claim 1 in which said driven member comprises a linearly operable gear rack which is operatively coupled with said head via a pinion such that rotary motion imparted to said head by said driving means causes said gear rack to be linearly operated.

9. A robot as set forth in claim 1 in which said driving means comprises a linearly operable driving gear rack and said driven member comprises a linearly operable driven gear rack, said driven means comprising pinion means in mesh with said driving gear rack such that linear operation of said driving gear rack imparts rotary motion to said pinion means and in turn rotary motion to said head about said vertical axis, and said driven gear rack is in mesh with said pinion means such that rotary motion of said pinion means imparts linear operation to said driven gear rack.

10. A robot as set forth in claim 9 in which said driving and driven gear racks are disposed to execute their respective linear operations along parallel paths.

11. A robot as set forth in claim 10 in which one of said two gear racks vertically overlies the other.

12. A robot as set forth in claim 11 in which each of said abutment stops is arranged to be linearly positionable along a linear path of adjustment having an axis which is parallel to and horizontally spaced from an axis along which said driven gear rack operates.

13. A robot as set forth in claim 12 in which said driving gear rack, said driven gear rack, and said pair of abutment stops are guided for execution of their respective motions on a vertical upright plate, said driving and driven gear racks being disposed on one side of said plate and said plate containing a horizontal slot disposed between said driven gear rack and said pair of abutment stops, said driven gear rack comprising an abutment means which projects from a main body portion through said slot so as to be disposed in the linear path of adjustment of each of said abutment stops, the abutment of said abutment means with either of said abutment stops being effective to arrest the travel of said driven gear rack and hence arrest the rotary motion of said head about said vertical axis.

14. A robot as set forth in claim 13 in which said toggle mechanism is placed in an over-center position at one of said abutment stop positions.

15. A robot as set forth in claim 14 in which each linear actuator acts along a corresponding axis and each actuator is so arranged in relation to the linear path of adjustment of the corresponding abutment stop that the axis of the actuator and the axis of the linear path of adjustment of the corresponding stop define an angle which subtends said vertical axis as viewed in the direction of said vertical axis, said toggle mechanisms being mounted for operation about respective vertical axes located adjacent opposite ends of said vertical plate.

16. A robot as set forth in claim 13 in which said driving gear rack is powered by a cable cylinder mechanism which comprises a main cylinder body operated by fluid power, pulleys at opposite ends of said main cylinder body and a tensioned cable extending from one end of the main cylinder body around the adjacent pulley, along a path parallel to the main body to the other pulley, around the latter pulley and re-entering the other end of the main cylinder body, and an operative connection between that portion of the cable which extends between the two pulleys and said driving gear rack via an aperture in said vertical plate.

17. A robot as set forth in claim 11 in which said means for supporting said head for rotation about said vertical axis includes means providing for vertical positioning of said head along said vertical axis.

18. A robot as set forth in claim 17 in which said means providing for vertical positioning of said head along said vertical axis comprises a support on which is supported a fluid power cylinder having an actuator which is arranged for vertical extension and retraction along said vertical axis and is operatively coupled with said head via a ball spline bearing and shaft coupling for elevating and lowering said head along said vertical axis, said means supporting said head for rotation about said vertical axis comprising structure supporting said coupling for rotation about said vertical axis while allowing said shaft to be displaced vertically relative to said bearing as the head is elevated and lowered by said fluid power cylinder.

19. A robot as set forth in claim 11 in which said arm is supported for horizontal extension and retraction on said head by an operating mechanism.

20. A robot as set forth in claim 19 in which the operating mechanism for said arm comprises one or more cable cylinder mechanisms.

21. A robot as set forth in claim 11 including means providing for vertical positioning of said head along said vertical axis comprising a support on which is supported a fluid power cylinder having an actuator which is arranged for vertical extension and retraction along said vertical axis and is operatively coupled with said head via a ball spline bearing and shaft coupling for elevating and lowering said head along said vertical axis, said means supporting said head for rotation about said vertical axis comprising structure supporting said coupling for rotation about said vertical axis while allowing said shaft to be displaced vertically relative to said bearing as the head is elevated and lowered by said fluid power cylinder and said arm is supported for horizontal extension and retraction on said head by an operating mechanism which comprises one or more cable cylinder mechanisms, and including a cable cylinder mechanism for operating said driving gear rack.

22. A robot as set forth in claim 21 in which each of said abutment stops is linearly positionable along a linear path of adjustment by a corresponding actuator operating the abutment stop by a corresponding toggle mechanism, each actuator comprises a linear actuator which acts along a corresponding axis and each actuator is so arranged in relation to the linear path of the adjustment of the corresponding abutment stop that the axis of the actuator and the axis of the linear path of adjustment of the corresponding stop define an angle which subtends said vertical axis as viewed in the direction of said vertical axis, said toggle mechanisms being mounted for operation about respective vertical axes.

23. A robot as set forth in claim 22 including shock absorbing means disposed between said abutment stops and said driven gear rack for shock absorbing the final increment of travel of said driven gear rack toward a stopped position of said driven gear rack determined by the particular abutment stop with which said driven gear rack is abutted.

24. A robot as set forth in claim 1 in which each said abutment stop comprises a main stop body on which a corresponding shock-absorbing stopping device is mounted, each of said shock-absorbing stopping devices being mounted on said corresponding main stop body by a threaded adjustment which allows the corresponding shock-absorbing stopping device to be finely adjusted to set the final stopping position of said driven gear rack when said driven gear rack abuts the corresponding abutment stop, and means for locking each shock-absorbing stopping device in its desired position of adjustment on the corresponding stop body.

25. A robot as set forth in claim 22 in which each abutment stop comprises a main stop body which is selectively operable to two positions, and one of said two positions of each abutment stop main body defines the same rotary position of said arm about said vertical axis, and in which said abutment stops are so arranged and selectively operable that the position defined by said one position of each of said abutment stops main body corresponds to a position of said arm which is semi-arcuately between positions of said arm which are respectively defined by the other position of each abutment stops main body.

26. A pick-and-place type robot comprising an arm having a gripper for articles to be picked and placed by the robot, a head on which said arm is supported, means for supporting said head for rotary motion about a vertical axis and a drive mechanism for imparting rotary motion to said head about said vertical axis comprising a driving means which is operably coupled with said head to produce a range of rotary motion of said head about said axis, a driven means which is driven by said head in correlation with rotation of said head over said range of rotary motion, said driving means comprising a first gear rack, and said driven means comprises two separate pinions which are spaced apart and concentric with said vertical axis, and means for correlating desired rotary positions of said head about said vertical axis at which the arm is to perform pick-and-place operations comprising a second gear rack driven by, and in direct correspondence with, said pinions, and abutment stop means selectively positionable with respect to said second gear rack for limiting the travel thereof by abutment therewith and thereby arresting rotary motion of said head about said vertical axis to desired positions which are correlated with the selective positioning of said abutment stop means.

27. A robot as set forth in claim 26 in which said two gear racks are arranged to execute linear motion along parallel paths.

28. A robot as set forth in claim 26 in which said first gear rack is driven by a cable cylinder mechanism.

29. A robot as set forth in claim 26 further including means to vertically elevate and lower said head along said vertical axis.

30. A robot as set forth in claim 26 in which said means for supporting said head for rotary motion about said vertical axis includes a pair of ball bearing assemblies which are spaced apart and concentric with said vertical axis, and a cylindrical member which is supported for rotation by said pair of ball bearing assemblies, said two pinions are disposed on said cylindrical member between said pair of ball bearing assemblies, one of said gear racks meshing with one of said pinions and the other of said gear racks with the other of said pinions.

31. A robot as set forth in claim 30 in which said two gear racks are arranged to execute linear travel along parallel paths which are vertically spaced apart in respective overlying and underlying relationship with each other, and said driving means includes a cable cylinder mechanism for operating the first-mentioned gear rack, and in which said abutment stop means comprises a pair of adjustable abutment stops which are selectively cooperatively associated with the second gear rack to control the rotary motion of said head by controlling the linear travel of said second gear rack.

32. A robot as set forth in claim 31 in which said cable cylinder mechanism includes a cable which is disposed in a substantially vertical plane.

33. A robot as set forth in claim 32 in which each abutment stop is operated by its own linear actuator operating through a corresponding toggle mechanism.

34. A robot as set forth in claim 33 in which each linear actuator operates along a corresponding line of action and the two linear actuators are so arranged that their respective lines of action lie on respective sides of an imaginary triangle, and in which said pair of abutment stops are so arranged that each abutment stop has a path of adjustment which lies on the third side of the imaginary triangle.

35. A robot as set forth in claim 30 further including means to vertically elevate and lower said head along said vertical axis.

36. A robot as set forth in claim 35 in which said arm is arranged for horizontal extension and retraction on said head by means of at least one cable cylinder mechanism.

37. A robot as set forth in claim 36 in which the direction of horizontal extension and retraction of said arm on said head is along a radial to said vertical axis.

* * * * *